(12) United States Patent
Flower et al.

(10) Patent No.: US 6,672,575 B2
(45) Date of Patent: Jan. 6, 2004

(54) SURFACE EFFECT DAMPER

(75) Inventors: Wallace C. Flower, Erie, PA (US); Douglas A. Hodgson, Fuquay-Varina, NC (US); Peter A. Masterson, Eric, PA (US); Paul J. Bachmeyer, Erie, PA (US)

(73) Assignee: Lord Corporation, Cary, NC (US)

( * ) Notice: Subject to any disclaimer, the term of this patent is extended or adjusted under 35 U.S.C. 154(b) by 0 days.

(21) Appl. No.: 09/879,511

(22) Filed: Jun. 12, 2001

(65) Prior Publication Data

US 2002/0185348 A1 Dec. 12, 2002

(51) Int. Cl.[7] ............... B60G 13/00; B60G 15/00; F16F 11/00; F16F 7/00
(52) U.S. Cl. ............... 267/205; 267/201; 267/207; 267/134
(58) Field of Search ............... 267/195, 196, 267/200, 201, 205, 207, 134

(56) References Cited

U.S. PATENT DOCUMENTS

| | | | | |
|---|---|---|---|---|
| 1,260,019 A | * | 3/1918 | Oliver | 213/31 |
| 1,706,745 A | | 3/1929 | Ribis | |
| RE23,515 E | * | 6/1952 | Withall | 213/32 R |
| 2,616,685 A | * | 11/1952 | Dath | 213/40 R |
| 2,715,952 A | | 8/1955 | Barnett | 188/129 |
| 2,994,442 A | * | 8/1961 | Frederick | 188/271 |
| 3,382,955 A | | 5/1968 | Deyerling | 188/129 |
| 3,796,288 A | * | 3/1974 | Hollnagel | 188/129 |
| 4,886,255 A | * | 12/1989 | Paton | 267/197 |
| 5,183,137 A | | 2/1993 | Siwek et al. | 188/381 |
| 5,257,680 A | * | 11/1993 | Corcoran et al. | 188/129 |
| 5,273,240 A | * | 12/1993 | Sharon | 188/271 |
| 5,535,861 A | | 7/1996 | Young | 188/281 |
| 5,613,580 A | | 3/1997 | Young | 188/300 |
| 5,634,537 A | | 6/1997 | Thorn | 188/300 |
| 5,651,536 A | * | 7/1997 | Daul | 16/50 |
| 5,720,369 A | | 2/1998 | Thorn | 188/300 |
| 5,758,937 A | | 6/1998 | Lammens et al. | 312/328 |
| 5,961,556 A | | 10/1999 | Thorn | 623/27 |
| 6,364,074 B2 | * | 4/2002 | Valembois | 188/136 |
| 6,386,528 B1 | * | 5/2002 | Thorn et al. | 188/129 |
| 6,412,606 B1 | * | 7/2002 | Wu | 188/266 |

FOREIGN PATENT DOCUMENTS

| | | | |
|---|---|---|---|
| DE | 1 955 235 | 2/1967 | |
| DE | 2 310 368 | 9/1974 | |
| EP | 1 069 337 A1 | 6/2000 | F16F/7/09 |
| FR | 734 266 | 10/1932 | |
| FR | 1 077 611 | 11/1954 | |
| FR | 1 122 015 | 8/1956 | |
| FR | 70249 | 3/1959 | |
| JP | 4731073 | * 11/1972 | |
| JP | 6053235 | * 3/1985 | 267/205 |
| WO | WO 01/04508 A1 | 1/2001 | |

* cited by examiner

Primary Examiner—Christopher P. Schwartz
Assistant Examiner—Devon C Kramer
(74) Attorney, Agent, or Firm—Edward F. Murphy, III

(57) ABSTRACT

A surface effect damper comprising a housing having a wall that defines a chamber, the housing having a first end, a second end and an axis; at least one contact element movable through the chamber between the housing ends in a first direction and in a second direction; and at least two damping elements substantially surrounding each contact element, each of the at least two damping elements being movable away from the axis and into frictional engagement with the wall as the at least one contact element is moved in a first direction and each of the at least two damping elements being movable toward the axis as the at least one contact element is moved in a second direction.

4 Claims, 5 Drawing Sheets

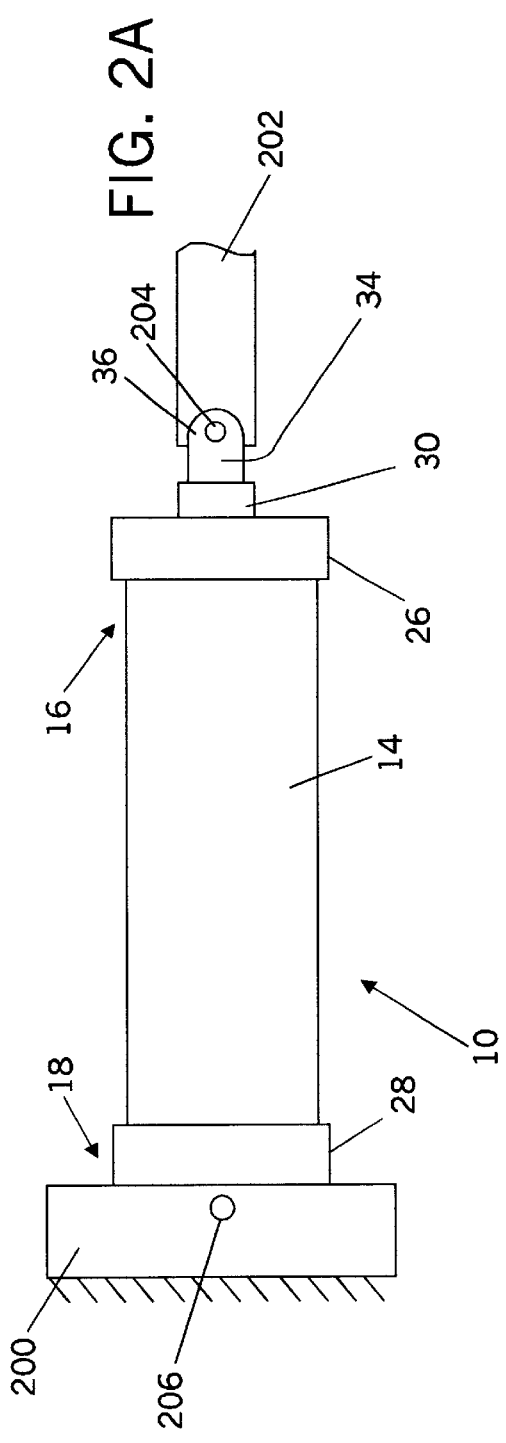
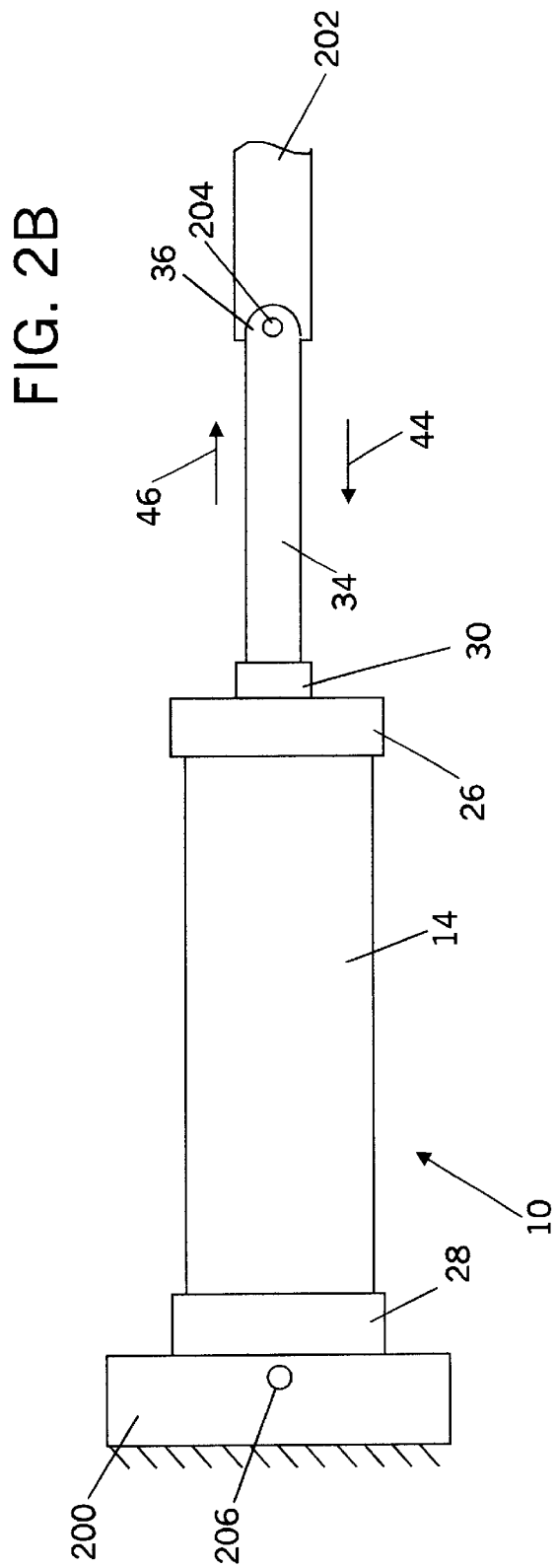

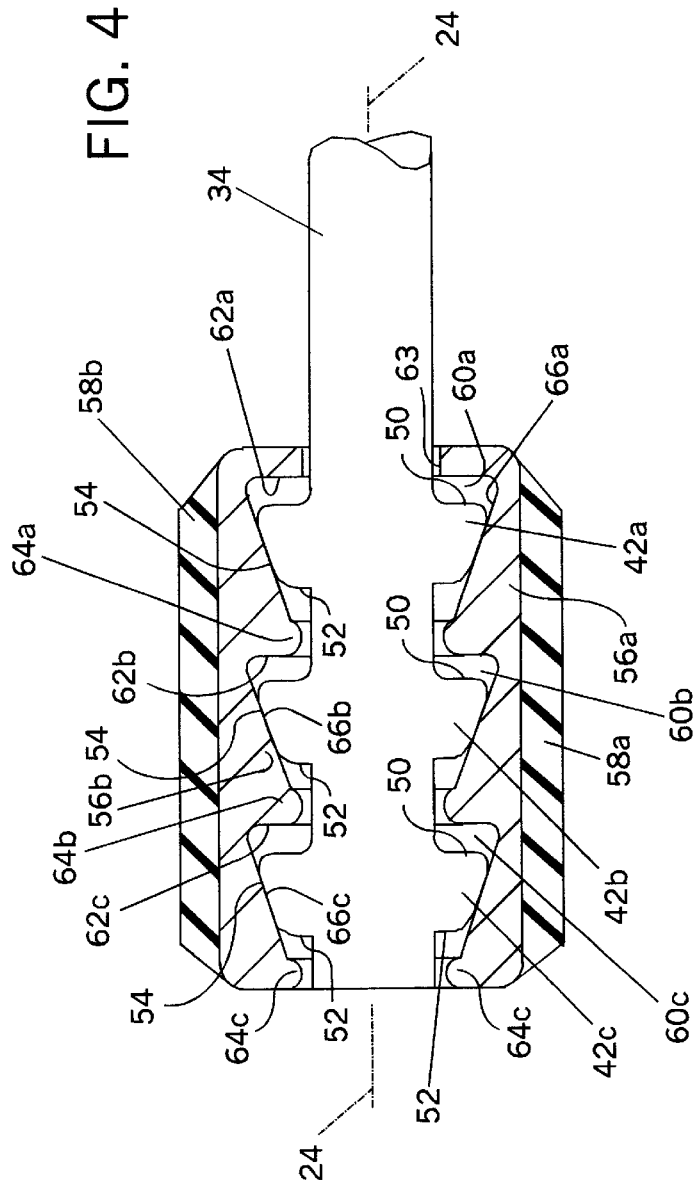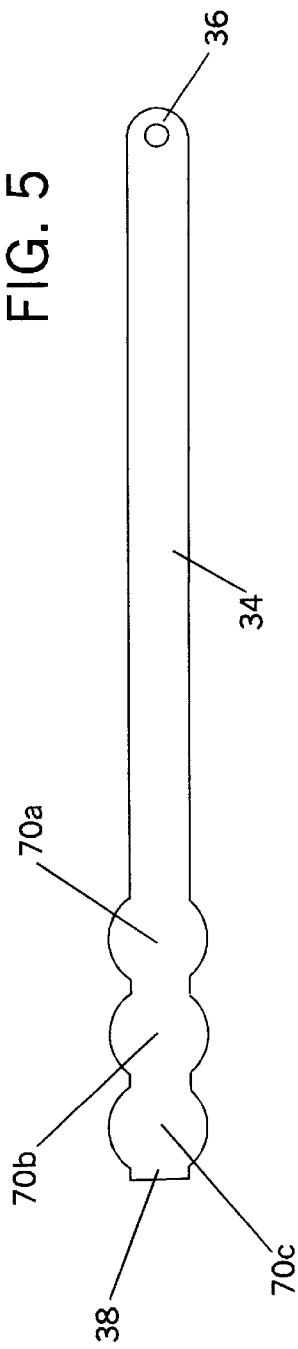

SURFACE EFFECT DAMPER

FIELD OF THE INVENTION

The invention relates to a damper for controlling the displacement of a movable member, and more specifically the invention relates to a surface effect damper that produces surface effect damping forces as the damper rod and damping elements are displaced through the damper housing.

BACKGROUND OF THE INVENTION

Frequently it is desirable to accurately control the relative motion between a stationary member and a movable member. Overhead storage bins represent a structure that would benefit from such motion control between the stationary storage bin and the movable overhead door. In typical overhead storage bins, the doors are rotatable relative to the bin and open easily so that when the door is fully raised it may be stored above the storage bin until it is necessary to again close the door. When it is necessary to close the door, the door is removed from above the storage bin and is rotated downward to a vertical position in front of the bin. In order to allow the door to come to rest against the bin, it is hand released by the person closing the door and as a result, the door may close with a slam against the storage bin.

The foregoing illustrates limitations known to exist in present overhead storage bin doors. Thus, in order to overcome the specific shortcomings in present bin door closing set forth above, and also generally to overcome shortcomings in relative movement between stationary and movable members, it is apparent that it would be advantageous to provide a damper that provides controlled motion to the moveable member as the member is moved in a first direction relative to the stationary member and provides little or no damping when the movable member is moved in a second direction relative to the stationary member. Accordingly, a suitable alternative damper is provided including features more fully disclosed hereinafter.

SUMMARY OF THE INVENTION

The present invention is a surface effect damper that provides controlled motion between movable and stationary members. The surface effect damper of the present invention comprising a housing having a wall that defines a chamber, the housing having first and second ends and defining an axis. The surface effect damper further comprises at least one contact element movable through the chamber between the housing ends in a first direction and in a second direction; and at least two damping elements substantially surrounding each contact element, each of the at least two damping elements being movable away from the axis and into frictional engagement with the housing wall as the at least one contact element is moved in a first direction and each of the at least two damping elements being movable toward the axis as the at least one contact element is moved in a second direction. In the damper of the present invention the contact element is the driving member and the damping elements are the driven members.

In one embodiment of the surface effect damper of the present invention the damping elements comprise discrete inner members with a single resilient layer made integral along the outer periphery of each of the inner members. In an alternate embodiment surface effect damper of the present invention the resilient layer is comprised of a unitary member located between the housing and the inner members.

In another embodiment of the surface effect damper of the present invention the surface effect damper, the damper housing comprises a closed first housing end and spring means located in the housing chamber between the closed first end and the contact element. The spring means may be any suitable spring such as a metal coil spring for example.

The foregoing and other aspects will become apparent from the following detailed description of the invention when considered in conjunction with the accompanying drawing figures.

BRIEF DESCRIPTION OF THE DRAWINGS

FIGS. 2A and 2B are elevational views of the surface effect damper of FIG. 1 where the damper is respectively in retracted and extended positions.

FIG. 4 is an enlarged view of the contact elements and damping elements of FIG. 1.

FIG. 5 is an alternate embodiment damper rod with spherical contact elements.

DETAILED DESCRIPTION OF THE PREFERRED EMBODIMENTS

Figure 1:
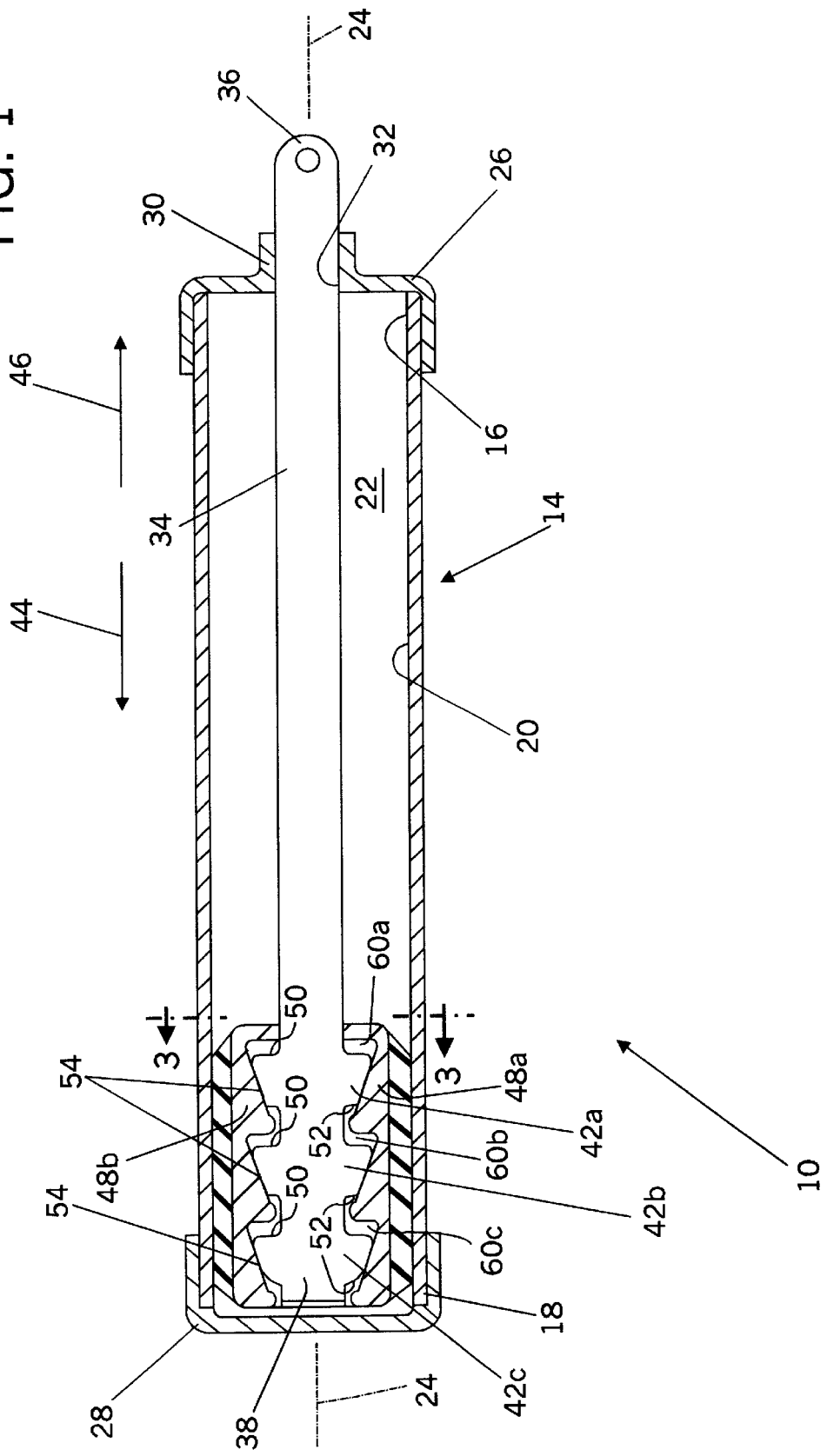
FIG. 1 is a longitudinal sectional view of the surface effect damper of the present invention.

A first embodiment of the surface effect damper of the present invention is disclosed in FIGS. 1–4. Now turning to the drawing figures wherein like parts are referred to by the same numbers in the several views, FIG. 1 illustrates the first embodiment surface effect damper 10 of the present invention that provides surface effect damping forces as the rod 34 and damping members 48a and 48b are displaced through the housing 14 along longitudinal axis 24. The surface effect damper 10 provides damping forces unilaterally as the rod and damping members are displaced in direction 44 shown in FIGS. 1, and 2B. Substantially no damping forces are produced by the damper 10 when the rod 34 and damping members 48a and 48b are displaced in the second direction 46 also shown in FIGS. 1 and 2B.

The terms "surface effect", "surface effect damping" and "surface effect damper" as used in this application comprise damping that is a combination of friction, viscous and hysteretic damping resulting from the relative motion of two surfaces. The relative motion can be sliding or rolling motion for example. Typically the moving surface is made from an elastomeric or polymeric material and frequently the moving surface is self lubricated.

Generally, the damper of the present invention is used to control the motion of a first movable member relative to a second member which is typically stationary. For example, the damper of the present invention may be used to control the motion of a movable cabinet door of an overhead storage cabinet as the cabinet door is closed relative to the stationary cabinet storage bin. The damper 10 of the present invention generally provides for controlled movement of a movable member 202 relative to a stationary member 200 shown schematically in FIGS. 2A and 2B. The damper 10 is made integral with base 200 or other stationary member via a conventional pin or other connection 206 at end 18. The movable end 36 of rod 34 is fixed to a movable member 202 by a conventional connection means 204 such as a pin, bolt or screw for example. Operation of the damper 10 of the present invention will be described in greater detail hereinbelow.

As best shown in FIG. 1, the tubular housing 14 is relatively rigid and is preferably made from a metal such as steel for example. However, the housing may be made from a suitable non-metal material such as a plastic. The housing defines a longitudinal axis 24 and comprises open first and second ends 16 and 18 respectively and a housing wall 20 that defines housing chamber 22. The first housing end 16 is substantially closed by end cap 26 and the second end is closed by end cap member 28. The end caps are removably attached to their respective ends in a conventional manner such as by a thread connection or plastic snap fit connection for example. The first end cap member includes centrally located and outwardly extending hub 30 that defines central opening 32 which in turn is adapted to permit rod 34 to pass through the end cap 26 as the damper 10 is extended and retracted by movement of the rod 34 through the housing chamber 22 in directions 44 and 46. It should be understood that the housing may be unitary with closed or substantially closed ends 16 and 18. In such a configuration the lateral walls formed during the manufacturing process.

The rod 34 comprises a first end 36 located outside of the housing chamber 22 and a second end 38 located in the housing chamber 22. The rod is unitary and includes a number of contact elements 42a, 42b and 42c spaced apart along a portion of the rod length at rod end 38. As shown in FIG. 1, for purposes of describing the preferred embodiment of the invention, the rod includes three contact elements however any suitable number of contact elements may be provided along the rod length. Generally, at least one contact element must be provided at rod end 38. The contact elements 42a, 42b and 42c are substantially the same and each extends completely around the rod 34. Additionally, as illustrated in FIG. 1, each contact element represents a frustum sometimes referred to as a frustoconical member. The contact elements may comprise any suitable shape. For example, alternatively, the contact elements may have a spherical shape as shown in FIG. 5. The alternate embodiment contact elements are identified as 70a, 70b and 70c in FIG. 5. Such spherical elements would be used in combination with inner members 56a and 56b.

Turning again to FIGS. 1 and 4, each contact element 42a, 42b and 42c has a first contact face 50, a second contact face 52 and an engagement surface 54 joining the faces 50 and 52. As shown in FIG. 1, each engagement surface 54 is sloped inwardly toward axis 24 as each surface extends from contact face 50 to contact face 52.

Figure 3:
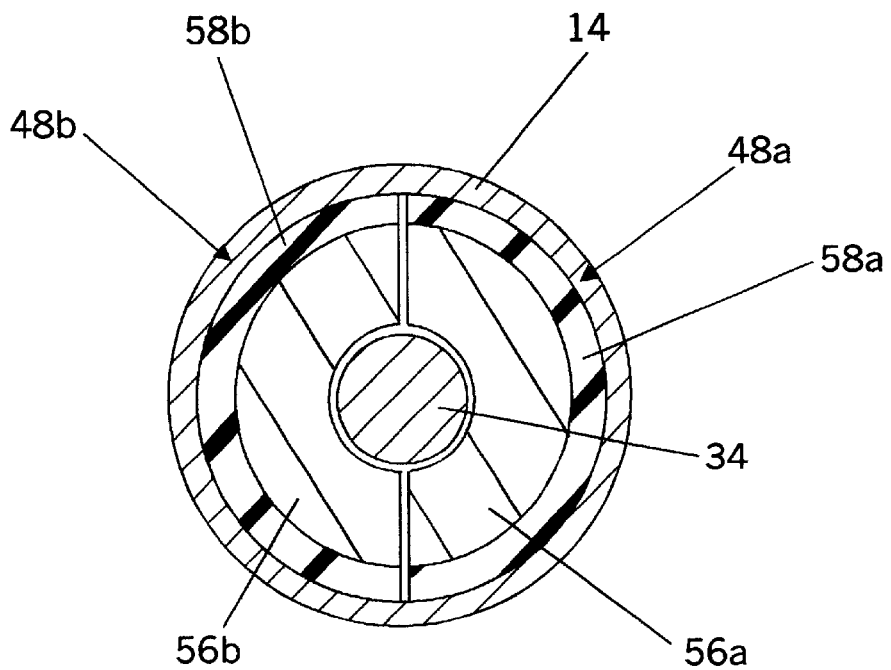
FIG. 3 is a lateral sectional view of the damper of FIG. 1 taken along line 3—3 in FIG. 1.

At least two damping elements 48a and 48b substantially surround the contact elements 42a, 42b and 42c and rod end 38. The damping elements 48a and 48b are movable away from the axis 24 by the contact elements 42a, 42b and 42c and into frictional engagement with the wall 20 as the rod and contact elements are moved in direction 44. The at least two damping elements are movable toward the axis 24 as the rod and contact elements are moved in the second direction 46. During operation of damper 10, the damping elements are displaced radially toward and away from the axis 24 relatively small distances. For example, the damping members may travel distances of only 0.014 inches (0.35 mm) toward and away from axis 24. As shown in FIG. 3, the damper 10 includes two like damping elements 48a and 48b however it should be understood that the surface effect damper 10 of the present invention may include any suitable number of damping elements. For example, the damper 10 may be comprised of three damping elements each having an equal 120° degree arc length or four damping elements each having a 90° arc length, or greater than four damping elements each having the same arc length. It is preferred that the arclengths be the same however it should be understood that the arc lengths could also be different.

As best shown in FIGS. 3 and 4, each damping element 48a and 48b includes a relatively rigid inner member 56a, 56b which may be made from a metal such as aluminum for example or plastic. A layer of resilient material 58a, 58b is bonded to the outer peripheral surface of each inner member 56a and 56b. The resilient material may be a rubber for example and is bonded to the respective inner member by a conventional adhesive such as Chemlok® Adhesive sold by Lord Corporation of Erie, Pa. The most desirable resilient material is one that comprises a self lubricating elastomer. During manufacturing of resilient layers 58a and 58b chamfers are provided on the outer lateral faces. See FIG. 4. Alternatively, the inner members 56a and 56b may be made from a thermoplastic elastomer (TPE). If TPE is utilized, during the manufacturing process, the stiff TPE members 56a and 56b are immediately overlaid with an elastic like plastic resilient layer 58a and 58b in a process known to those skilled in the art as coinjection. Each inner member 56a and 56b defines a portion of a contact element chambers 60a, 60b and 60c. In the embodiment of the present invention shown in FIGS. 1–4, each damping element inner member defines half of each of the contact element chambers 60a, 60b and 60c. Each contact element chamber represents a frustum similar to the shape of the contact elements 42a, 42b and 42c. The volume of the contact chambers are slightly greater than the volumes of the respective contact members 42a, 42b and 42c. Additionally, rather than damping elements comprised of inner members and resilient layers, for all of the embodiments described herein, the damping elements may be comprised of unitary elastomer members. Such elements would include the contact chambers as previously described.

The contact element chambers are substantially the same and each is defined at one end by a contact surface 62a, 62b and 62c. The contact surface of chamber 60a defines an opening through which rod 34 travels as the damper is extended and retracted. The opposite end of the chamber is substantially open and includes an annular stop ring 64a, 64b and 64c that prevents overtravel of the respective contact element and ultimately of the rod end 38. Each stop ring and contact surface are joined by a contact surface 66a, 66b and 66c. Each surface is tapered inwardly toward axis 24 as the surface extends from contact 62 to stop ring 64 and the angle of taper or slope of each surface 66 is substantially the same as the corresponding angle of taper or slope of each contact element 42.

Operation of the damper 10 will now be described. Turning to FIGS. 2A and 2B, the damper is connected to the stationary base 200 and the movable member 202 in conventional well known manners. When the movable member such as the cabinet door is in an initial closed position the damper is retracted as shown in FIG. 1 and FIG. 2A. The damping elements resilient layers are in minimal contact with the chamber wall 20. The resilient layers are typically at all times in contact with the wall 20 however the resilient layers may be separated from the housing wall by a small distance such as 0.014 inches and the rod end 38 is located proximate end cap 28. The contact is shown in FIG. 3 for example.

As best shown in FIGS. 2B and 4, when it is necessary to displace the movable member from the first or closed position, as the movable member 202 is displaced the rod 34 is drawn in direction 46. The contact elements are drawn through their respective contact chambers 60a, 60b and 60c until the contact face 50 of each contact element is in contact with respective contact face 62a, 62b and 62c. The damping elements are moved with the rod in direction 46. Substantially no damping is provided by surface effect damper 10 as the rod is extended in the direction 46. The resilient layers 58a and 58b are in minimal contact with wall 20. However, the layers are not forced against the wall by radially outwardly directed contact forces that are a result of the contact between the contact members and the inner members of the damping elements.

When the movable member is moved to a second position such as a closed position for example, the rod 34 is moved in direction 44. The contact elements 42a, 42b and 42c are moved with the rod in direction 44 and the engagement surfaces of the contact members and contact chamber are in constant contact as the elements are moved toward rings 64a, 64b and 64c respectively. As the contact members are displaced axially, the contact between the engagement surfaces produces radially outwardly acting forces that urge the damping elements 48a and 48b away from axis 24 and the resilient layers are moved into friction engagement with housing wall 20. Surface effect damping is provided by the engagement between the resilient layers and the housing wall. The surface effect damping limits the rate of displacement of the rod 34 in direction 44 and thereby controls the rate of displacement of the movable member connected to the first rod end 36 such as a cabinet door for example. The stop rings limit the travel of the contact elements in direction 44.

When it is necessary to again displace movable member in direction 46, upon movement of the rod, the damping force is immediately reduced as the radially outwardly acting forces are removed and the damping elements are displaced inwardly toward axis 24. The elements are in minimal contact with wall 20. The operation of damper 10 in direction 46 is as previously described hereinabove. In the detailed descriptions of all the preferred embodiments of the inventions it should be understood that directions 44 and 46 are provided in order to describe a preferred embodiment of the invention and that the damper may be reconfigured to provide damping in either direction 46 or direction 44.

Figure 6:
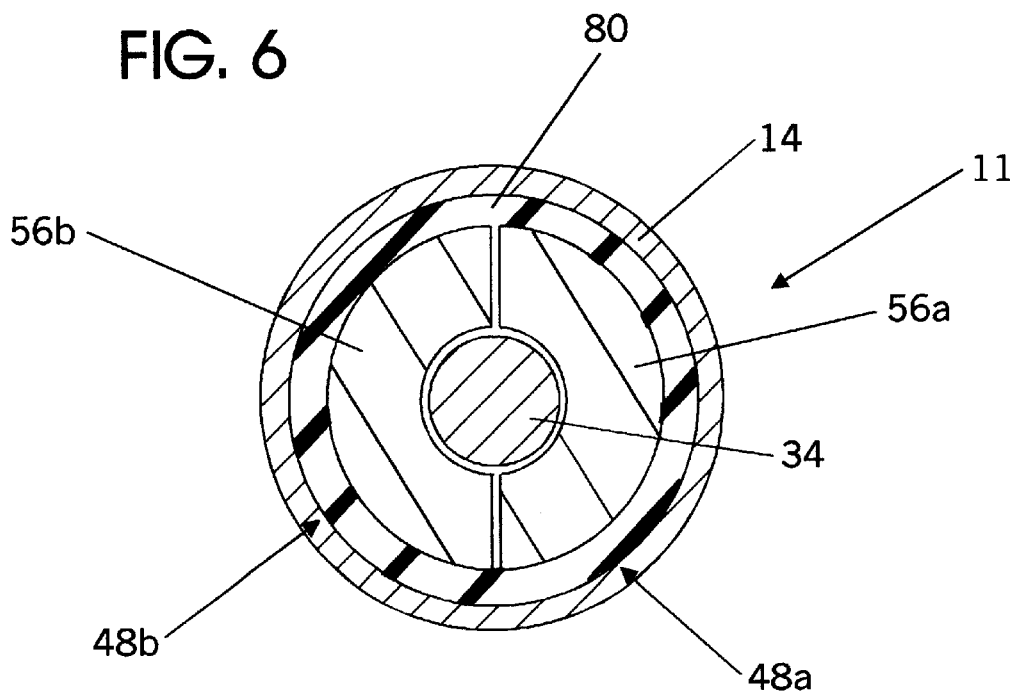
FIG. 6 is a lateral sectional view of a second embodiment surface effect damper.

A second embodiment surface effect damper 11 is disclosed in FIG. 6. The second embodiment surface effect damper includes the housing 14, end caps 26, 28, rod 34, contact elements 42a, 42b and 42c and inner members 56a and 56b as previously described in first embodiment surface effect damper 10. Turning now to FIG. 6, the second embodiment damper 11 comprises damping elements 48a and 48b that are comprised of inner members 56a and 56b in combination with a tubular resilient sleeve 80 around the inner members 56a and 56b and in minimal contact with the housing wall 20. Like damper 10, the surface effect damper 11 may comprise any number of inner members and as shown in FIG. 6, two inner members are provided in the second embodiment damper.

The single unitary tubular resilient member 80 may be any suitable rubber or other resilient material and preferably the resilient material is self lubricating. The inner members 56a and 56b may be bonded to the inner surface of resilient layer 80 either chemically, through use of an adhesive or the resilient layer 80 may be retained mechanically. When the resilient layer 80 is mechanically retained the resilient layer will be prevented from being displaced axially along axis 24 by tab members (not shown) on inner members 56a and 56b. Such the tabs would extend radially outwardly at the layer ends.

During use, when the rod 34 is moved in direction 44, the inner members 56a and 56b are displaced radially outwardly in the manner previously described with first embodiment damper 10. However, the radially outwardly displacement causes the unitary resilient layer 80 to stretch radially outwardly and into friction engagement with wall 20 of housing 14. The resultant friction engagement produces the desired surface effect damping as the damper is moved in direction 44. When the rod is extended in direction 46, the resilient layer immediately withdraws radially inwardly to its prestretched dimensions and is in minimal contact with the wall 20. The resilient layer remains in minimal contact with wall 20 when it returns to its prestretched dimensions. As a result, substantially no damping is supplied when the rod is moved in direction 46.

Figure 7:
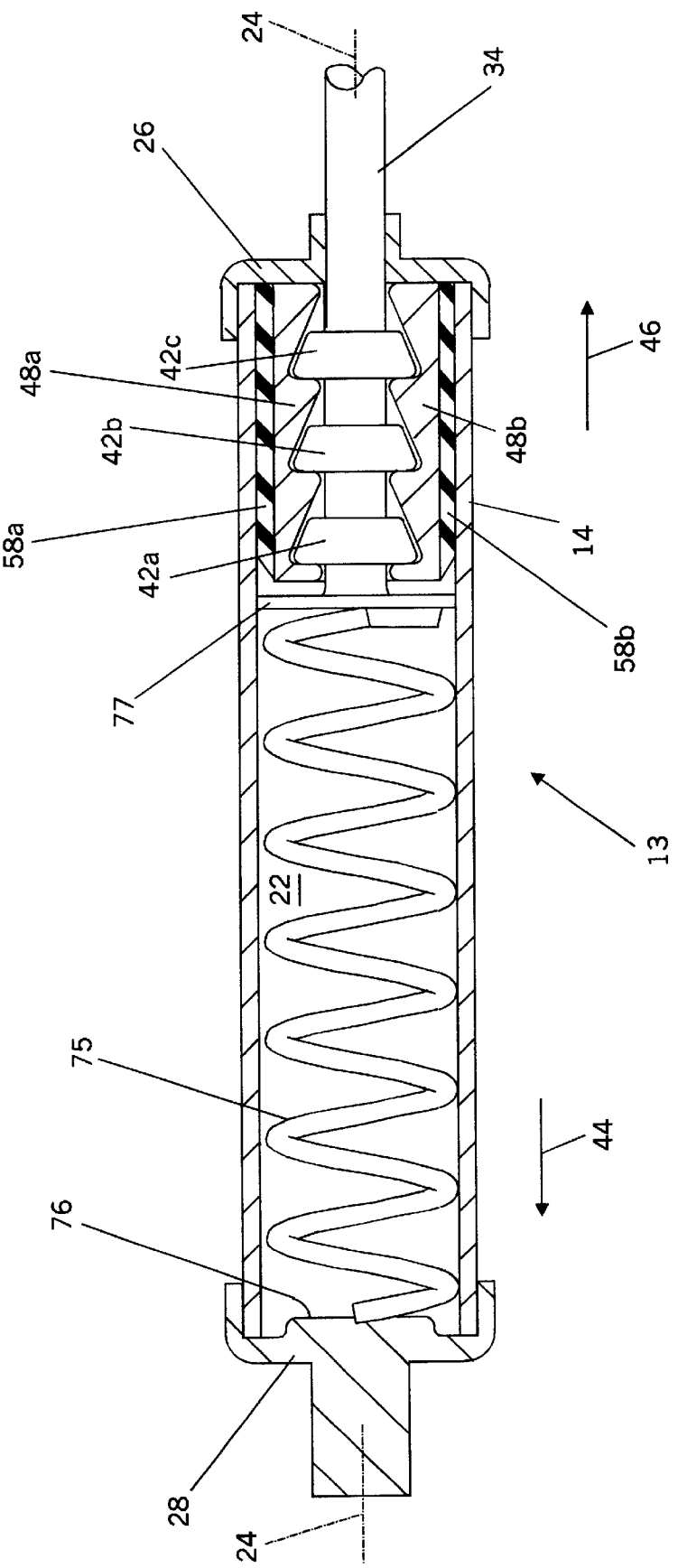
FIG. 7 is a longitudinal section view of a third embodiment surface effect damper.

A third embodiment surface effect damper 13 is shown in FIG. 7. The unilateral surface effect damper 13 may be used when damping is required in direction 46 rather than direction 44. In addition to housing 14; rod 34; contact members 42a, 42b, and 42c; end caps 26 and 28 and resilient layers 58a and 58b, the third embodiment surface effect damper also comprises a spring member 75 in chamber 22 between end cap 28 and plate 77 which is made integral with rod 34. In an alternate embodiment, plate 77 may be discrete and may be connected to rod 34 by a screw or other suitable means. As shown in FIG. 7, the spring is a coil spring with free spring ends in engagement with the inner surface 76 of end cap 28 and plate 77 adjacent contact member 42a. It should be understood that spring 75 may be any suitable spring member. When the damper is retracted and the rod 34 is moved in direction 44, the spring 75 is compressed between the end cap 28 and plate 77. The resilient layer 58 is in minimal contact with wall 20. Substantially no surface effect damping is provided as the damper is retracted and spring 75 is compressed. When the rod 34 is extended in direction 79, the spring energy urges the rod in direction 79 as the spring returns to its precompressed length and damping elements 48a and 48b are urged radially outwardly and away from axis 24 by the engagement between the contact members 42a, 42b and 42c and the damping elements 48a and 48b as previously described with the first and second surface effect dampers 10 and 11. Further description of the contact between the contact members and damping members is not required.

While we have illustrated and described a preferred embodiment of our invention, it is understood that this is capable of modification and therefore we do not wish to be limited to the precise details set forth, but desire to avail ourselves of such changes and alterations as fall within the purview of the following claims.

We claim:

1. A surface effect damper comprising: a housing having a smooth rigid housing inner wall that defines a chamber with said chamber housing wall being protrusion free, the housing having a first end, a second end and an axis; at least one contact element movable through the chamber along said protrusion free chamber housing wall and between the housing ends in a first direction and in a second direction; and at least two damping elements substantially surrounding each contact element, each of the at least two damping elements being movable away from the axis and into frictional engagement with the protrusion free chamber housing wall as the at least one contact element is moved in a first direction and each of the at least two damping elements being movable toward the axis as the at least one contact element is moved in a second direction wherein the contact elements are made integral with a rod.

2. A surface effect damper comprising: a housing having a smooth rigid housing inner wall that defines a chamber with said chamber housing wall being protrusion free, the housing having a first end, a second end and an axis; at least one contact element movable through the chamber along said protrusion free chamber housing wall and between the housing ends in a first direction and in a second direction; and at least two damping elements substantially surrounding each contact element, each of the at least two damping elements being movable away from the axis and into frictional engagement with the protrusion free chamber housing wall as the at least one contact element is moved in a first direction and each of the at least two damping elements being movable toward the axis as the at least one contact element is moved in a second direction wherein each of the damping elements comprises an inner member and a resilient layer made integral with the inner member.

3. A surface effect damper comprising: a housing having a smooth rigid housing inner wall that defines a chamber with said chamber housing wall being protrusion free, the housing having a first end, a second end and an axis; at least one contact element movable through the chamber along said protrusion free chamber housing wall and between the housing ends in a first direction and in a second direction; and at least two damping elements substantially surrounding each contact element, each of the at least two damping elements being movable away from the axis and into frictional engagement with the protrusion free chamber housing wall as the at least one contact element is moved in a first direction and each of the at least two damping elements being movable toward the axis as the at least one contact element is moved in a second direction wherein the damping elements comprise contact element chambers that are defined by a contact face and an engagement surface that is directed inwardly toward the axis as the engagement surface extends away from the contact face.

4. A surface effect damper comprising: a housing having a smooth rigid housing inner wall that defines a chamber with said chamber housing wall being protrusion free, the housing having a first end, a second end and an axis; at least one contact element movable through the chamber along said protrusion free chamber housing wall and between the housing ends in a first direction and in a second direction; and at least two damping elements substantially surrounding each contact element, each of the at least two damping elements being movable away from the axis and into frictional engagement with the protrusion free chamber housing wall as the at least one contact element is moved in a first direction and each of the at least two damping elements being movable toward the axis as the at least one contact element is moved in a second direction wherein each of the at least one contact elements comprises a first contact face, a second contact face and an engagement surface extending between the contact faces, the engagement surface being directed toward the axis as the engagement surface extends from the first contact face to the second contact face.

\* \* \* \* \*